United States Patent [19]

Radermacher

[11] Patent Number: 4,758,141
[45] Date of Patent: Jul. 19, 1988

[54] VANE PUMP WITH FLEXIBLE TONGUE VALVE

[75] Inventor: Bernhard Radermacher, Viersen, Fed. Rep. of Germany

[73] Assignee: Pierburg GmbH, Fed. Rep. of Germany

[21] Appl. No.: 59,055

[22] Filed: Jun. 8, 1987

[30] Foreign Application Priority Data

Jul. 19, 1986 [DE] Fed. Rep. of Germany ....... 3624532

[51] Int. Cl.⁴ .................. F16K 15/14; F04C 2/344
[52] U.S. Cl. ............................ 418/270; 137/513.5; 137/855
[58] Field of Search .............. 418/270, 173; 137/512.15, 853, 855, 856, 513.5

[56] References Cited

U.S. PATENT DOCUMENTS

| 1,555,192 | 9/1926 | Dennedy | 137/512.15 |
| 2,151,746 | 3/1939 | Cody | 137/856 |
| 3,256,831 | 6/1966 | Eickmann | 418/173 |
| 3,306,226 | 2/1967 | Walter | 418/173 |
| 4,514,157 | 4/1985 | Nakamura | 418/270 |
| 4,696,263 | 9/1987 | Boyesen | 137/855 |

FOREIGN PATENT DOCUMENTS

| 206154 | 12/1986 | European Pat. Off. | 418/270 |
| 3015942 | 10/1981 | Fed. Rep. of Germany. | |
| 3619167 | 1/1987 | Fed. Rep. of Germany | 418/270 |

Primary Examiner—William L. Freeh
Attorney, Agent, or Firm—Roberts, Spiecens & Cohen

[57] ABSTRACT

A vane pump having a plurality of working chambers each of whose volume changes from a minimum to a maximum value and back again during one revolution, and wherein intake and delivery ports open axially into the working cells and are formed with cross sections adapted for fluid conveyance without internal compression. Such compression is achieved by a valve plate which forms a non-return and is formed with a resilient tongue valve which, commencing from the starting end of the delivery port controls, upon proper pump operation, about two-thirds of the cross section of the mouth of the delivery port.

10 Claims, 2 Drawing Sheets

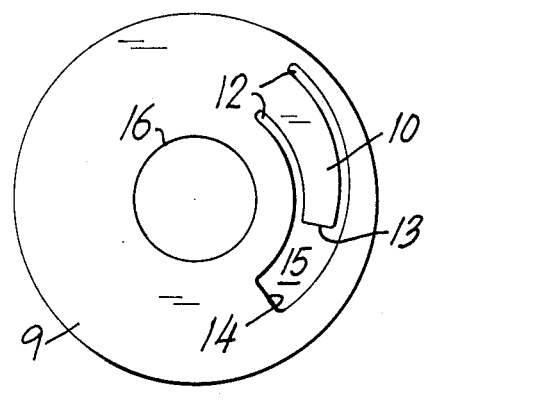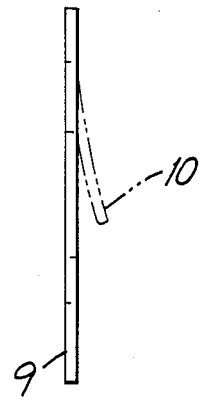
FIG. 3  FIG. 4
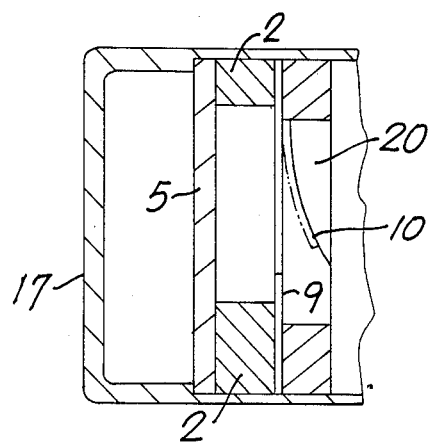
FIG. 5

VANE PUMP WITH FLEXIBLE TONGUE VALVE

FIELD OF THE INVENTION

The invention relates to pumps and particularly to vane pumps having inner and outer rotors driven in rotation at different speeds, especially for conveying fuel to an internal combustion engine.

Such pumps have a plurality of closed conveyor chambers each of which has a volume which changes from a minimum to a maximum and back again during each pump revolution. The pump has intake and delivery ports which open axially into the conveyor chamber and the cross-sections of the mouths of the ports are adapted to convey the fluid without internal compression, this being achieved by plates or discs which form non-return valves which are applied against axial surfaces of the parts of the pump.

DESCRIPTION OF PRIOR ART

Such pumps are frequently used in combination with electric motors as fuel pumps in automotive vehicles.

However, in the case of high ambient temperatures, the pumps not only draw in liquid but also vapor bubbles which collapse suddenly upon transfer from the intake side of the pump to the delivery side of the pump as a result of the conveyance pressure. This produces pulsations in the fuel delivery and the production of disturbing noise.

DE-OS No. 30 15 942 discloses an oil pump in which the pressure region has a valve disc which rests with predetermined tension against the end walls of the pump parts and acts as a pressure regulating valve so that the delivery side can empty only when there is a higher pressure therein than in the delivery port.

Since the oil pump is a crescent pump having an inner gear wheel and an outer gear wheel which mesh at a location at which only one intake and one delivery chamber are present, the pressure region can be relieved of load in a simple manner by the lifting-off of the valve plate. This arrangement, however, is not applicable to the pumps of the type according to the invention as all working chambers would adjust themselves simultaneously to the same pressure level.

SUMMARY OF THE INVENTION

An object of the invention therefore is to provide means in a vane pump or in a pump of this type having inner and outer rotors driven at unequal speeds of rotation, for permitting opening of the working chamber only when the pressure in each individual chamber has exceeded the value at which vapor bubbles have already collapsed.

This object is achieved by the construction wherein a valve plate includes a resilient tongue which covers about two-thirds of the cross-sectional area of the delivery port measured from the starting end of the delivery port. The tongue is deformable under the pressure developed in each working chamber to open the mouth and control the fuel delivery over said restricted area of about two-thirds of the area of the delivery port.

According to a feature of the invention, a stop means is provided in the delivery port for engaging the tongue when it is open to its maximum degree.

Advantageously, the valve plate is made of a highly elastic material, such as spring steel, which also has the benefit of producing minimum friction with the other parts of the pump.

By virtue of the construction according to the invention it has become possible to produce vane pumps or pumps with inner and outer rotors which, even in the event that vapor bubbles are drawn in will not exceed the noise level customary for normal pump operation. Moreover, the invention also makes it possible to achieve this end without major structural or manufacturing expense.

BRIEF DESCRIPTION OF THE FIGURES OF THE DRAWING

One embodiment of the invention will be described below with reference to a vane pump illustrated in the appended drawing, in which:

FIG. 3 is a top plan view of a plate valve of the pump;

FIG. 4 is a side view of the plate valve; and

FIG. 5 is a sectional view of the pump taken along line 5—5 in FIG. 1.

DETAILED DESCRIPTION OF A PREFERRED EMBODIMENT OF THE INVENTION

Figure 1:
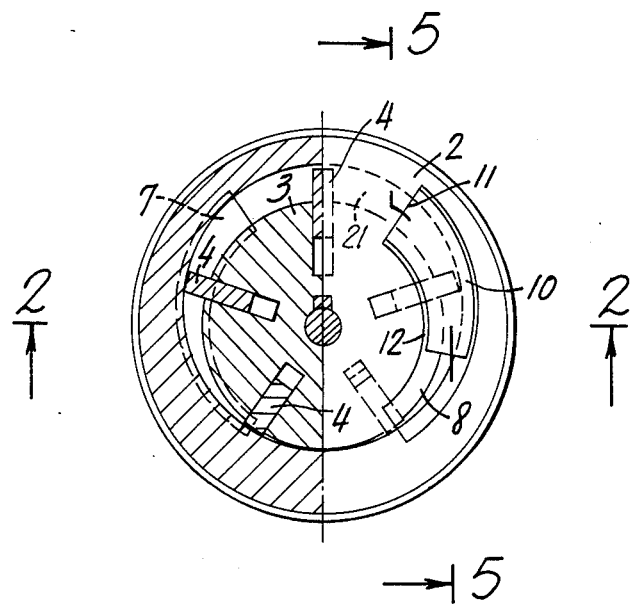
FIG. 1 is a diagrammatic illustration of vane pump in transverse section taken along line 1—1 in FIG. 2.
Figure 2:
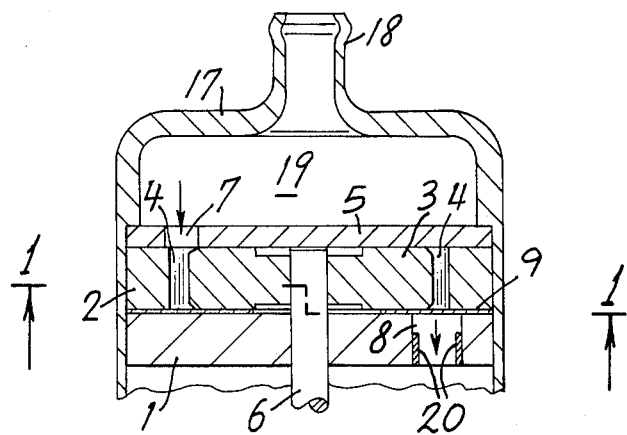
FIG. 2 is a longitudinal sectional view of the pump taken along line 2—2 in FIG. 1.

The drawing shows a vane pump which comprises an end plate 1 and an outer cylindrical ring 2 having an eccentric bore therein in which a rotor 3 is rotatable about an axis offset from the center of the eccentric bore. The rotor 3 supports slidable, radial vane members 4 which are urged outwardly into contact with the inner surface of the eccentric bore in the cylindrical ring 2 by suitable means, such as, springs (not shown). A cover 5 covers the ring 2 and rotor 3 at the end opposite the plate 1. The rotor 3 is driven in rotation by a motor shaft 6.

The cover 5 has an inlet port 7 of semi-crescent shape and the end plate 1 has a discharge outlet 8 of the same shape. A valve plate 9 is arranged between the end plate 1 and the cylindrical ring 2 and rotor 3.

The plate 9 is formed at the valve discharge outlet 8 with a tongue 10 which serves as a valve member. The valve plate 9 covers end surfaces of the cylindrical ring 2, the rotor 3 and the vane members 4. Measured from the end 11 of the discharge outlet 8, the tongue 10 extends along a portion of the length of outlet 8 so that upon proper pump operation, the tongue controls about two-thirds of the cross section of the outlet 8.

The tongue 10 is produced by a punching operation in which slots 12 are formed in the valve plate 9. The slots 12 and the tongue 10 are curved and the tongue 10 extends as a curved crescent-shaped element in cantilever fashion from the remainder of the valve plate 9. In this way the tongue 10 conforms to the shape of the outlet 8 which it covers. The free end 13 of the tongue 10 is spaced from the end 14 of a slot 15 which is formed in the valve plate 9. The overall area of the slot 15, tongue 10 and slots 12 corresponds to the area of the outlet 8 and, as previously explained, the area of the tongue 10 represents about two-thirds of the area of the outlet 8. The valve plate 9 is provided with a hole 16 for shaft 6.

A cap 17 with an inlet 18 for fuel or the like surrounds the cover 5, the ring 2 and the and plate 1 and forms a chamber 19 above the cover 5 which communicates with inlet port 7.

The valve plate 9 is made of a highly elastic material, such as a metal, for example, spring steel which produces little friction with respect to the pump parts. In its maximum open position, shown in FIG. 5, the tongue 10 seats itself against ramps 20 in the end plate 1 (or an intermediate shield) in the outlet 8 which serves as stop means to prevent application of excessive load on the tongue exceeding the permissible material stresses. The tongue 10 in the illustrated embodiment lies in the plane of the valve plate in its undeformed state and is deformed as shown in FIG. 5 to open the outlet 8. The tongue 10 could also be initially bent out of the plane of the valve plate so that when the tongue is returned in its initial state in the plane of the plate 9, the tongue is under stress and can bear against stop means (not shown) formed on the rings 2 and 3. In this way, the tongue 10 would be under initial resilient stress in its closed position.

In either case, the tongue 10 initially covers about two-thirds of the cross section of outlet 8 and is displaced out of the plane of plate 9 to empty fuel in the working chambers 21 into the outlet 8 when the pressure in the working chamber passing over the tongue exceeds the pressure in the outlet 8. In this way, the pressure then prevailing in the chamber 21 is sufficient to allow vapor bubbles, which may have been drawn in with the fuel, to collapse before the tongue 10 opens the outlet 8. The pressure of the fuel which is discharged at outlet 8 is free from pulsations and excessive noise is avoided.

Since it is assumed that the vapor bubbles do not exceed a certain proportional ratio, the tongue 10 can be formed such that commencing from the starting end 11 of the outlet 8, upon proper pump operation, only about two-thirds of the cross section of the outlet 8 is controlled since all vapor bubbles will then have already collapsed.

While the invention has been described with reference to a preferred embodiment, it will become obvious to those skilled in the art that numerous modifications and variations thereof can be made within the scope and spirit of the appended claims.

What is claimed is:

1. A fuel pump comprising inner and outer annular members adapted for relative rotation, vane means on one of said members defining working chambers between said members which vary in volume upon relative rotation between said members, spaced inlet and outlet ports communicating with said chambers during said relative rotation for respective supply and delivery of fuel to and from said chambers and a valve plate bearing against said members and including a resilient tongue covering about two-thirds of the area of said outlet port, said tongue being deformable by pressure developed in the chambers to open the outlet port, said outlet port being curved and said tongue being curved in conformance with said outlet port.

2. A fuel pump as claimed in claim 1 comprising an end plate adjoining said members, said outlet port being provided in said end plate, said valve plate being interposed between said end plate and said inner and outer members.

3. A fuel pump as claimed in claim 1 wherein said inner member is a rotor and said outer member is a stator.

4. A fuel pump as claimed in claim 1 wherein said tongue projects into said outlet port when deformed.

5. A fuel pump as claimed in claim 4 comprising stop means for engaging said tongue in the deformed state thereof.

6. A fuel pump as claimed in claim 1 wherein said valve plate is made of resilient material.

7. A fuel pump as claimed in claim 6 wherein said resilient material is a metal.

8. A fuel pump as claimed in claim 1 wherein said tongue is a curved cantilever element having an initial state disposed in the plane of the valve plate and a deformed state bent out of the plane of the valve plate.

9. A fuel pump as claimed in claim 8 wherein in said initial state said tongue is under stress and tends to return to said initial state after release of the pressure which produced the deformation of the tongue.

10. A fuel pump as claimed in claim 9 wherein said tongue tapers in width towards the free end thereof.

* * * * *